No. 755,042. PATENTED MAR. 22, 1904.
P. J. PHILLIPS.
STEAM COOKER.
APPLICATION FILED DEC. 29, 1902.
NO MODEL.
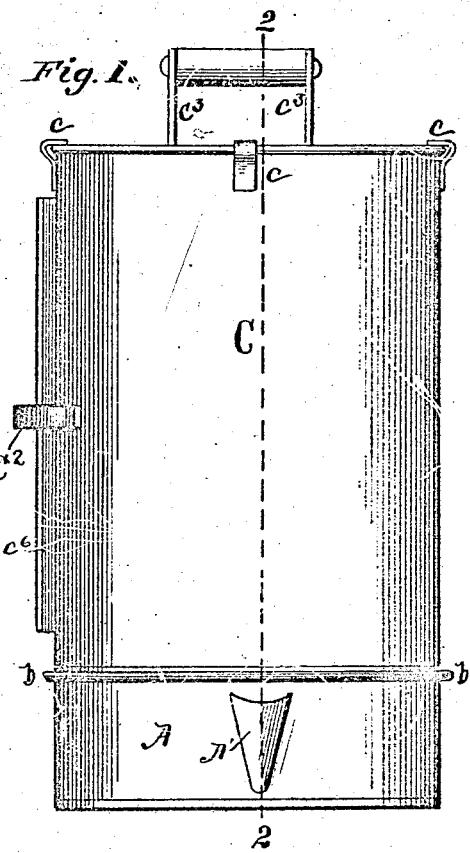
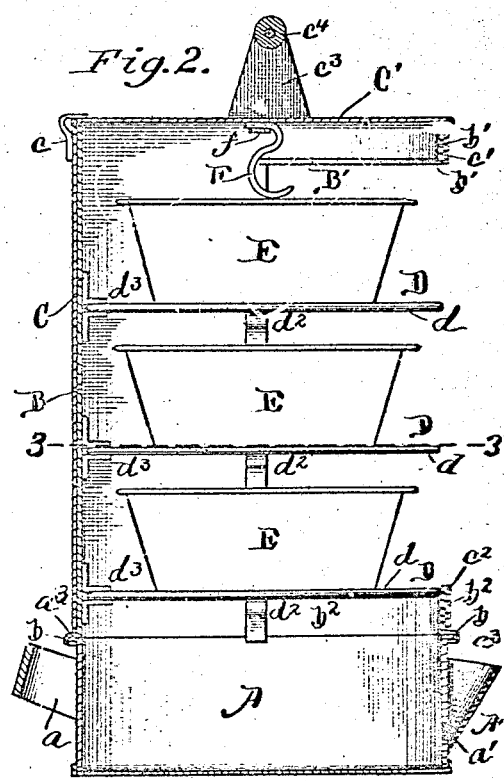
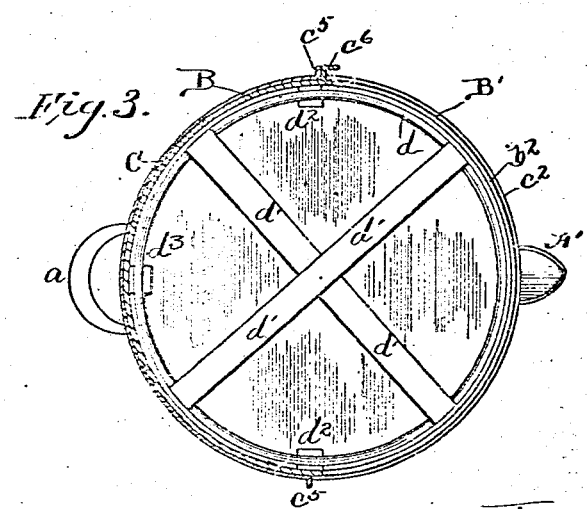
Witnesses
Inventor
Paul J. Phillips
By Banning & Banning
Attys No. 755,042.

Patented March 22, 1904.

UNITED STATES PATENT OFFICE.

PAUL J. PHILLIPS, OF CHICAGO, ILLINOIS.

STEAM-COOKER.

SPECIFICATION forming part of Letters Patent No. 755,042, dated March 22, 1904.

Application filed December 29, 1902. Serial No. 137,033. (No model.)

*To all whom it may concern:*

Be it known that I, PAUL J. PHILLIPS, a citizen of the United States, residing at Chicago, in the county of Cook and State of Illinois, have invented a certain new and useful Improvement in Steam-Cookers, of which the following is a specification.

This invention relates to steam-cookers which are employed for the purpose of heating or parboiling foods, and it is so arranged that several varieties of food may be cooked at the same time without interfering with one another.

The cooker of this invention is so arranged that it may be easily opened or closed or partly opened and partly closed and articles of food inserted thereinto or removed therefrom without interfering with other articles of food within the cooker.

In the drawings, Figure 1 is a front elevation of the cooker, showing the sliding door closed; Fig. 2, a sectional elevation of the cooker on line 2 of Fig. 1 with the sliding door open, and Fig. 3 a cross-sectional view on line 3 of Fig. 2 of the cooker as shown in Fig. 2.

As shown, the steam-cooker is constructed with a water tank or receptacle A, preferably of copper, which may be tinned within or otherwise treated, if so desired, and to the rear of this tank is attached a handle $a$ for the purpose of turning or tilting the entire device when so desired. The tank is provided with a hole or opening $a'$ in its wall which communicates with a spout $A'$, into which water may be poured in filling the water tank or receptacle. Around the top of the water-tank is an outwardly-turned flange $a^2$, to which the body B of the cooker is attached by means of a head $b$, which entirely surrounds the flange $a^2$ and may be brazed, soldered, or otherwise secured thereto. The body-section B has its entire front portion cut away with the exception of an upper ring $b'$ and a corresponding lower ring $b^2$. The opening in the body is closed by means of a curved sliding door C of a size and shape adapted to slide around the body and conform to the curvature thereof, and the door is supported at its top and bottom by means of the upper and lower rings $b'$ and $b^2$, which serve to complete the circle of the body. Attached to the top of the body and the upper ring is a top C', which forms at the point of attachment a slight shoulder or flange against which the top of the door abuts and which serves to hold the door firmly in place at all times. In order, however, to further insure against the vertical movement of the door, it is provided with a plurality of angular guides which project over the top and further serve to hold the door in place. The door is provided with upper and lower bands or collars $c'$ and $c^2$, which encircle the upper and lower rings of the body and coincide therewith when the door is fully open, but when the door is closed, as shown in Fig. 1, contact with the body-wall of the cooker. In order to lift the cooker, a handle is provided, consisting of two vertically-disposed plates $c^3$, between which is mounted a handle $c^4$, of wood or other suitable material. A sliding movement of the door is effected by means of a handle $C^2$ of any suitable form. The side edges of the sliding door terminate in outwardly-turned flanges $c^5$, which are adapted to contact with a forwardly-turned vertically-disposed stop $c^6$, which is secured to one side of the body, near the edge thereof, the stop being so arranged as to limit the travel of the door when the same has been fully opened or fully closed.

Within the cooker is a rack, preferably of open formation, which consists of a series of open shelves D, each one of which is composed of a ring $d$, across which extend in transverse direction two strips $d'$, on which rests the pans, pots, or other cooking utensils. The shelves are supported upon rests $d^2$ at the sides of the cooker and $d^3$ at the rear thereof, the latter rests being formed of two sections, between which the rings are held, thereby preventing movement of the rings when vessels have been placed thereon and the door closed. As shown in Fig. 2, a series of pans E are arranged on the shelves; but the shelves may be removed when so desired, and a hook F, held by means of a socket $f$, may be employed from which to hang a vessel or article of food to be cooked.

In use water is poured into the spout, filling the tank or receptacle to a suitable depth, after which the articles of food are arranged within the cooker upon their respective shelves and the sliding door closed by means of the handle $C^2$. As the water is evaporated by the action of the heat, it may be renewed from time to time without disturbing the cooking operation or opening the door, and when it becomes necessary to remove one of the several articles of food within the cooker such removal can be effected without disturbing the other articles.

What I regard as new, and desire to secure by Letters Patent, is—

1. In a steam-cooker, the combination of a bottom tank for containing water, a semicylindrical body having an opening on one side with a continuing ring of the body at the top and at the bottom of the opening and attached at its lower edge to the upper edge of the tank with an exterior bead at the joint between the body and the tank, and a semicylindrical sliding door located exteriorly of and conforming to the curvature of and adapted to close the opening of the body and having a continuing ring at the top and at the bottom and riding at its lower edge on the bead between the body and the tank as a track, substantially as described.

2. In a steam-cooker, the combination of a bottom tank for containing water, a semicylindrical body having an opening on one side with a continuing ring of the body at the top and at the bottom of the opening and attached at its lower edge to the upper edge of the tank with an exterior bead at the joint between the body and the tank, a semicylindrical sliding door located exteriorly of and conforming to the curvature of and adapted to close the opening of the body and having a continuing ring at the top and at the bottom and riding at its lower edge on the bead between the body and the tank as a track, and a series of shelves spaced apart and located one above the other within the body, substantially as described.

3. In a steam-cooker, the combination of a bottom receptacle provided on one side with an inlet-opening for supplying water thereto, a semicylindrical body having an opening on one side with an upper ring and a lower ring continuing from and completing the circle at the top and bottom of the body and attached at its lower edge to the upper edge of the receptacle with an exterior bead at the joint, and a sliding door of semicylindrical shape adapted to close the opening in the body and having an upper ring and a lower ring conforming to the curvature of the body and the upper and lower rings thereof and located exteriorly of the body, substantially as described.

4. In a steam-cooker, the combination of a bottom receptacle provided on one side with an inlet-opening for supplying water thereto, a semicylindrical body having an opening on one side with an upper ring and a lower ring continuing from and completing the circle at the top and bottom of the body and attached at its lower edge to the upper edge of the receptacle with an exterior bead at the joint, a sliding door of semicylindrical shape adapted to close the opening in the body and having an upper ring and a lower ring conforming to the curvature of the body and the upper and lower rings thereof and located exteriorly of the body and a series of open shelves spaced apart and located one above the other within the body, substantially as described.

5. In a steam-cooker, the combination of a bottom tank, having an outwardly-turned flange on its upper edge, a spout on one side of the tank and opening thereinto for supplying water to the tank, a semicylindrical body having an opening on one side with an upper ring and a lower ring continuing from and completing the circle at the top and bottom of the body and the lower ring having a reversely-turned flange to receive the flange at the top of the tank uniting the tank and body and forming an exterior bead at the joint, a top attached to the upper end of the body and the upper ring and having its periphery projecting beyond the circle of the body and ring, a sliding door of semicylindrical shape adapted to close the opening in the body and to fit between the bead around the body at its lower end and the projecting edge of the top and having an upper ring and a lower ring conforming to the curvature of the body and of the upper and lower rings of the body and located exteriorly of the body, and a vertically-disposed stop on the body and adapted to limit the travel of the door, substantially as described.

6. In a steam-cooker, the combination of a semicylindrical body having an opening on one side thereof, a row of rests on the body adjacent to each side of the opening, a row of back rests on the body centrally in front of the opening, each back rest consisting of an upper and lower part with a space between them, and a series of shelves located within the body, each shelf consisting of a rim and crossing strips for the rims to enter the double back rest and to lie upon the single side rests supporting the shelf within the body, substantially as described.

PAUL J. PHILLIPS.

Witnesses:
OSCAR W. BOND,
WALKER BANNING.